US009258492B2

(12) United States Patent
Takagi (10) Patent No.: US 9,258,492 B2
(45) Date of Patent: Feb. 9, 2016

(54) IMAGE PROCESSING APPARATUS, IMAGE PICKUP APPARATUS INCLUDING IMAGE PROCESSING APPARATUS, IMAGE PROCESSING METHOD, AND STORAGE MEDIUM IN WHICH PROGRAM IS STORED FOR ACQUIRING AND PROCESSING IMAGES TAKEN AT DIFFERENT FOCUS POSITIONS (71) Applicant: CANON KABUSHIKI KAISHA, Tokyo (JP)

(72) Inventor: Shin Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 13/736,593

(22) Filed: Jan. 8, 2013

(65) Prior Publication Data
US 2013/0182151 A1    Jul. 18, 2013

(30) Foreign Application Priority Data

Jan. 12, 2012 (JP) ................. 2012-003736

(51) Int. Cl.
H04N 5/235 (2006.01)
H04N 5/262 (2006.01)

(52) U.S. Cl.
CPC .................. *H04N 5/2621* (2013.01)

(58) Field of Classification Search
CPC .......... H04N 5/23232; H04N 5/232145; H04N 5/232151; G06T 7/0065; G06T 7/0069; G06T 2207/10148; G02B 27/1066
USPC ........................ 348/240.99, 222.1
See application file for complete search history.

(56) References Cited

U.S. PATENT DOCUMENTS

| 6,445,415 B1* | 9/2002 | Olsson ................ 348/345 |
| 2008/0122944 A1* | 5/2008 | Zhang ................ 348/222.1 |
| 2013/0201368 A1* | 8/2013 | Voss et al. ............. 348/240.2 |

FOREIGN PATENT DOCUMENTS

| JP | 11-023949 A | 1/1999 |
| JP | 2002-112095 | 4/2002 |
| JP | 2008-160274 A | 7/2008 |
| JP | 2008-271241 A | 11/2008 |
| JP | 2009-301181 | 12/2009 |

OTHER PUBLICATIONS

The above foreign patent documents were cited in the Nov. 17, 2015 Japanese Office Action, which is enclosed without an English Translation, that issued in Japanese Patent Application No. 2012-3736.

* cited by examiner

Primary Examiner — Twyler Haskins
Assistant Examiner — Quang Le
(74) Attorney, Agent, or Firm — Cowan, Liebowitz & Latman, P.C.

(57) ABSTRACT

An image processing apparatus includes an image acquisition unit configured to acquire a first image and a second image taken at a different focus position from the first image, an image magnification calculator configured to calculate a first image magnification of an object in the first image and a second image magnification of the object in the second image, an image size changer configured to change an image size of at least one of the first and second images so as to reduce a difference between the first and second image magnifications that are calculated by the image magnification calculator, according to the difference between the first and second image magnifications, and a processor configured to perform a calculation using the first and second images after the image size is changed by the image size changer.

7 Claims, 7 Drawing Sheets

IMAGE PROCESSING APPARATUS, IMAGE PICKUP APPARATUS INCLUDING IMAGE PROCESSING APPARATUS, IMAGE PROCESSING METHOD, AND STORAGE MEDIUM IN WHICH PROGRAM IS STORED FOR ACQUIRING AND PROCESSING IMAGES TAKEN AT DIFFERENT FOCUS POSITIONS

BACKGROUND OF THE INVENTION

1. Field of the Invention

The present invention relates to a method for separating images taken at different in-focus positions into an object and a backdrop and, in particular, to an image processing apparatus configured to separate into the object and the backdrop by considering the difference in the image magnification of the object between images taken serially.

2. Description of the Related Art

As a technique for taking a picture, there is a method of taking an image in a state of blurring a backdrop that is a part other than a focused object image by reducing the depth of field to narrow a focused image. In order to take an image where the depth of field is reduced, it is required that an aperture stop of a camera is opened to make the focus length longer. Generally, a single reflex camera that has an image pickup lens of large diameter and is capable of selecting variety of combinations of the aperture stop and a shutter speed can take an image using the above technique.

On the other hand, a compact digital still camera and a camera-equipped cell-phone capable of taking an image that are popular in late years employ an image pickup lens having a small lens aperture and a very short focal length to reduce the size, and therefore the depth of field is very deep. Accordingly, it is difficult to take an image where the backdrop is blurred while the above technique is used.

A method of generating an image having a blur emphasized more than that of an image taken by driving a real aperture or lens is proposed. Hereinafter, the method is referred to as "backdrop blur".

In order to achieve the backdrop blurring, a processing for separating an area of a main object, such as a person, from areas of other objects, such a backdrop, is required. As one of the processing methods, two images are taken at different focus positions, and an area of a main object and an area of the backdrop are separated depending on the change of an edge amount between both of the images.

In case where a user takes images at different focus positions in a stage of having the camera in hand, a relative position shift is caused due to a camera shake or the like in each taken image. Therefore, in order to apply the above method, it is necessary to calculate the change of the edge amount after positions of the images are matched by correcting the relative positional shift.

However, when the position shift amount for the position adjustment is calculated, a relative calculation is performed between images where the level of the blur is different from each other, and therefore the accuracy of the calculation result of the position shift is reduced.

Further, as a method for achieving the backdrop blur by the position adjustment between images taken at different focus positions, for example, Japanese patent Laid-Open No. 2002-112095 proposes a method of acquiring two sampling images between main images and of calculating a position shift amount between the main images by using the sampling images. In particular, firstly, in a single shutter operation, two continuous image pickup operations are performed at different focus positions. Secondly, in a main image A where an obtained main object is focused and a main image B where a backdrop of a main object is focused, two sampling images are taken in between when the main image A is taken and when the main image B is taken. Thirdly, the position shift amount of the main image B from the main image A is calculated using the two sampling images. Further, the main image A and the main image B where the position shift is corrected based on the calculated position shift amount are synthesized, and an image having a desired level of the blur is obtained.

However, a conventional technique described in the above-mentioned Japanese patent Laid-Open 2002-112095 takes a temporal difference between the main image and the sampling image. For example, if a camera shake is caused between when the main image is taken and when the sampling image is taken, a calculated position shift amount between the sampling images is affected by the effect of the camera shake. Therefore, an error is caused when the position shift amount between the sampling images is used as a position shift amount between the main images.

Furthermore, since the position shift amount is calculated using the sampling image which has a smaller size than the main image, the accuracy of the calculated position shift amount is low. In particular, in case where the position shift amount for the main image is calculated using ⅛ sampling images as embodiment in Japanese patent Laid-Open 2002-112095 and the calculated result is converted to the position shift amount in the main image to be eventually obtained, the position shift amount can detect the position shift amount only at each eight pixels.

The case does not consider the change of the image magnification of an object depending on the change of the focus position, and cannot perform a processing of improving the accuracy of the position adjustment.

SUMMARY OF THE INVENTION

The present invention provides an image processing apparatus that separates into an object and a backdrop in images at different focus positions, with high accuracy.

An image processing apparatus as one aspect of the present invention includes an image acquisition unit configured to acquire a first image and a second image taken at a different focus position from the first image, an image magnification calculator configured to calculate a first image magnification of an object in the first image and a second image magnification of the object in the second image, an image size changer configured to change an image size of at least one of the first and second images so as to reduce a difference between the first and second image magnifications that are calculated by the image magnification calculator, according to the difference between the first and second image magnifications, and a processor configured to perform a calculation using the first and second images after the image size is changed by the image size changer.

An image processing method as another aspect of the present invention includes the steps of acquiring a first image and a second image taken at a different focus position from the first image, calculating a first image magnification of an object in the first image and a second image magnification of the object in the second image, changing an image size of at least one of the first and second images so as to reduce a difference between the first and second image magnifications that are calculated in the calculating step, according to the difference between the first and second image magnifications, and performing a calculation using the first and second images after the image size is changed in the changing step.

A non-transitory computer-readable storage medium as another aspect of the present invention stores a program causing a computer to execute an image processing method including the steps of acquiring a first image and a second image taken at a different focus position from the first image, calculating a first image magnification of an object in the first image and a second image magnification of the object in the second image, changing an image size of at least one of the first and second images so as to reduce a difference between the first and second image magnifications that are calculated in the calculation step, according to the difference between the first and second image magnifications, and performing a calculation using the first and second images after the image size is changed in the changing step.

Further features and aspects of the present invention will become apparent from the following description of exemplary embodiments with reference to the attached drawings.

DESCRIPTION OF THE EMBODIMENTS

Figure 1:
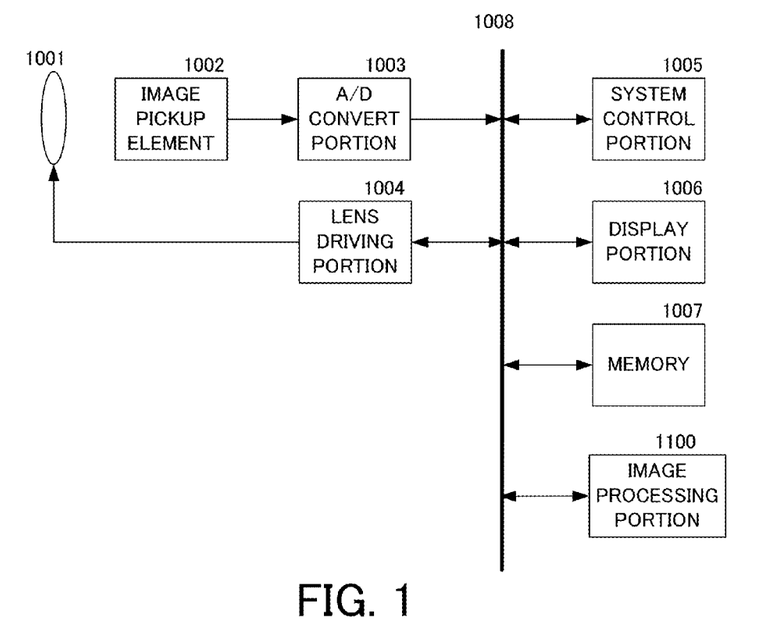
FIG. 1 is a block diagram of an image processing apparatus in first and second embodiments.
Figure 2:
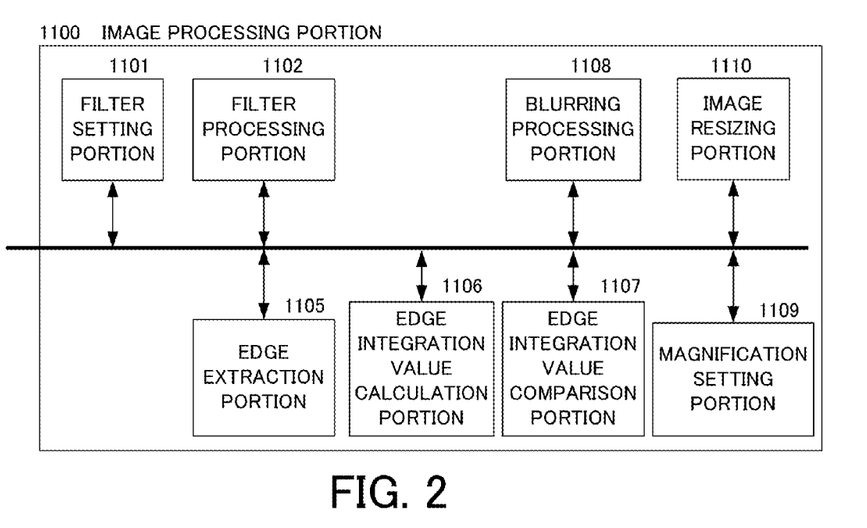
FIG. 2 is a block diagram of an image processing portion of the image processing apparatus in first embodiment.

Exemplary embodiments of the present invention will hereinafter be described with reference to the accompanying drawings. FIGS. 1 and 2 are block diagrams that illustrates a skeleton framework of an image processing apparatus in embodiments of the present invention.

First Embodiment

Hereinafter, a method of separation into an object and a backdrop in first embodiment of the present invention is described with reference to FIGS. 1 and 2.

FIG. 1 is a block diagram that illustrates a configuration applicable to the image processing apparatus in first embodiment.

In FIG. 1, an image pickup lens 1001 optically forms an object image on an image pickup element 1002. The image pickup element 1002 (image pickup unit) converts the object image through the image pickup lens 1001 into an electrical signal with a photoelectrical conversion element, such as a CCD or a CMOS sensor, to generate an image signal. An A/D convert portion 1003 converts the image signal output from the image pickup element 1002 into a digital image signal.

A lens driving portion 1004 (lens driver) is controlled by after-mentioned system control portion 1005, and drives the image pickup lens 1001 in an optical axis direction to change the focus position. Further, the lens driving portion 1004 is capable of outputting drive information of the image pickup lens 1001.

The system control portion 1005 is a control function portion that controls operations of the whole apparatus.

A display portion 1006 is configured by a liquid crystal display or an organic EL (Electro Luminescence) display, and displays an image generated in the image pickup element 1002 or an image read out from a memory 1007. The memory 1007 has a function that records an image and may include, for example, an information storage medium using a package or the like that houses a rotation storage medium, such as a memory card equipped with a semiconductor memory and a magneto optical disc, and may be configured so as to detach the information storage medium.

A bus 1008 is used for communicating between the A/D convert portion 1003, the lens driving portion 1004, the system control portion 1005, the display portion 1006, the memory 1007, and an image processing portion 1100.

The image processing portion 1100 extracts an object area from lens drive information and a plurality of image signals at different focus positions, and performs a blurring processing in an area other than the object area.

The following is a concrete configuration of the image processing portion 1100 that is a feature of the present invention. FIG. 2 is a block diagram that illustrates an example of the concrete configuration of the image processing portion 1100.

The image processing portion 1100 in first embodiment is configured as illustrated in FIG. 2. Specifically, the image processing portion 1100 includes a filter setting portion 1101, a filter processing portion 1102, an edge extraction portion 1105, an edge integration value calculation portion 1106, an edge integration value comparison portion 1107, a blurring processing portion 1108, a magnification setting portion 1109, and an image resizing portion 1110.

Figure 3:
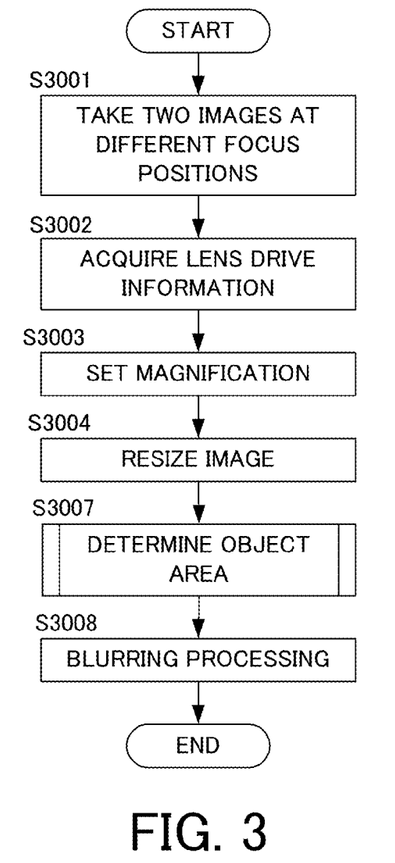
FIG. 3 is a flowchart in first embodiment.

FIG. 3 is a flowchart for explaining a processing matter of the image processing portion. Hereinafter, first embodiment will be described with reference to the flowchart in FIG. 3.

In addition, in image taking of step S3001 in this embodiment, by fixing the image processing apparatus on a tripod or the like to take an image, a positional shift due to the camera shake and the like between two images is suppressed and is ignorable.

Figure 7A:
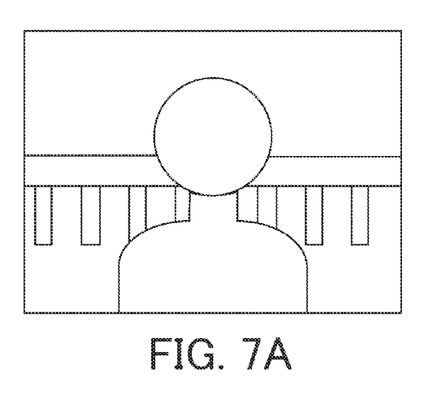
FIGS. 7A and 7B are taken images in first embodiment.

Firstly, the image pickup lens 1001 is driven to a first lens position on which a person that is a main object is focused to take an image. This taken image (first image) is illustrated in FIG. 7A. Since the taken image focuses on the main object, a backdrop excluding the main object is out of focus. The main object is not limited to a parson and may be, for example, an animal, such as a dog, a cat and a bird, or a vehicle, such as a car, a train and an airplane.

Figure 7B:
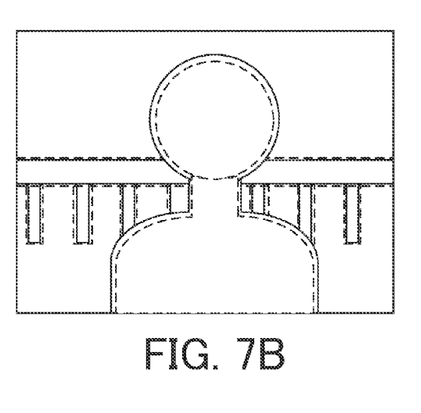

Secondly, the image pickup lens 1001 is driven by Δx from the first lens position to a second lens position on which the backdrop is focused, and an image is taken. This taken image (second image) is illustrated in FIG. 7B. In addition, a dotted line in FIG. 7B does not exist on a real object, represents the object in FIG. 7A, and displays the difference in an image magnification of the object between FIG. 7A and FIG. 7B.

As to the sequence of image taking, an image focused on the backdrop may be firstly taken. However, a time period from a start of image taking till when the focused main image is taken is short in case that an image focused on the main object is firstly taken as described above, and therefore this case is preferable.

Further, while the number of images taken at different focus positions was assumed to two, many more images may be used as long as the number is two or more. For example, when there are a plurality of types of main objects, an image of focusing on each of the plurality of objects object and an image of focusing on the backdrop are taken, and the plurality of taken images may be used.

In step S3002, a lens drive amount Δx from the first lens position on which the main object is focused to the second lens position on which the backdrop is focused is acquired as lens drive information when the images are taken at different focus positions in step S3001.

In step S3003, in a filter setting portion 1101, a ratio of change of the image magnification of the main object between the image focused on the main object (FIG. 7A) and the image focused on the backdrop (FIG. 7B) is firstly calculated using the lens drive amount Δx acquired in step S3002. At least one of the images is resized according to the calculated ratio of change of the image magnification of the main object so that the image magnification of the main object becomes equal.

Hereinafter, the method for calculating the ratio of change of the image magnification will be described.

Figure 8A:
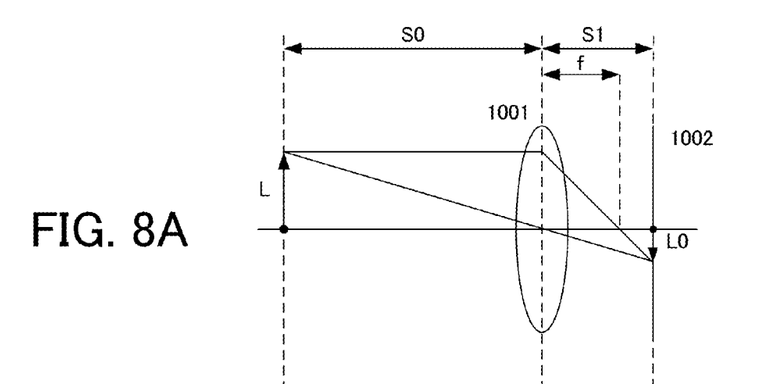
FIGS. 8A and 8B are diagrams that illustrate the change of an image magnification between images in first and second embodiments.
Figure 8B:
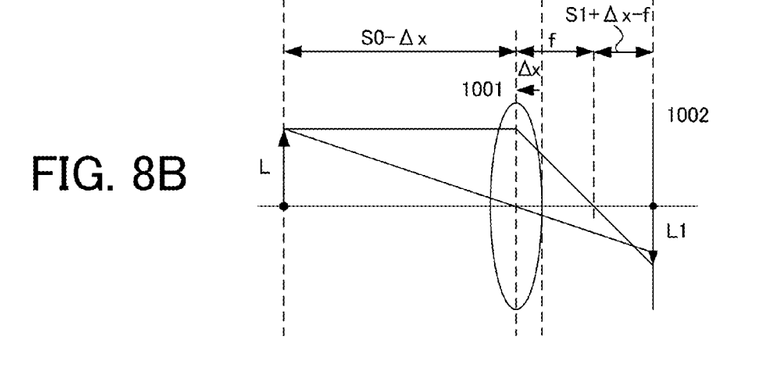

In step S3003, the magnification setting portion 1109 (image magnification calculator) detects the change of the image magnification of the object based on the lens drive information of the lens driving portion 1004 that is stored in the memory 1007 to set the magnification. A method for calculating a ratio of change a of the image magnification is described with reference to FIGS. 8A and 8B. FIG. 8A illustrates a positional relationship between the image pickup lens 1001 and the image pickup element 1002 when the first image is taken. FIG. 8B illustrates a positional relationship between the image pickup lens 1001 and the image pickup element 1002 when the second image is taken.

The "L" in FIGS. 8A and 8B denotes an object when the first image is taken, and the "L0" denotes an object projected on the image pickup element 1002. The "S0" denotes the distance between the image pickup lens 1001 and the object, the "S1" denotes the distance between the image pickup lens 1001 and the image pickup element 1002, and the "Δx" denotes the distance by which the image pickup lens 1001 is moved between when the first image is taken and when the second image is taken. In order to calculate the ratio of change of the image magnification of the object between the first and second images, the following expressions for the lens (expression 1) is firstly used.

$$1/f = 1/S0 + 1/S1 \quad \text{[EXPRESSION 1]}$$

Expression 2 is derived by transforming expression 1.

$$S0 = f \cdot S1/(S1-f) \quad \text{[EXPRESSION 2]}$$

If expression 2 is used, an image magnification m1 (first image magnification) when the first image is taken is expressed by expression 3.

$$\text{image magnification } m1 = S1/S0 = (S1-f)/f \quad \text{[EXPRESSION 3]}$$

An image magnification m2 (second image magnification) when the second image is taken is expressed by expression 4.

$$\text{image magnification } m2 = (S1+\Delta x-f)/f \quad \text{[EXPRESSION 4]}$$

The ratio of change a of the image magnification of the second image to that of the first image is expressed by expression 5 on the basis of expression 3 and 4.

$$\text{ratio of change a of the image magnification} = m2/m1 = (S1+\Delta x-f)/(S1-f) \quad \text{[EXPRESSION 5]}$$

Since the focal length f of the lens, the distance S1 between the lens and the image pickup surface when the first image is taken, and a lens drive distance Δx are known, the ratio of change a of the image magnification is calculated by expression 5, and the value is used for setting the magnification for resizing the second image.

Figure 9:
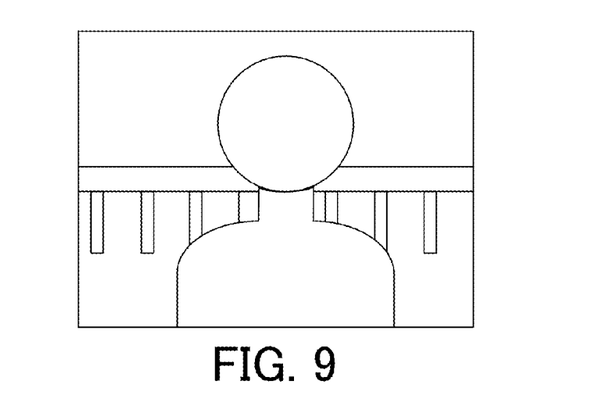
FIG. 9 is an image to which an image magnification of a second image in first embodiment is added.

In step S3004, based on the ratio of change a that is set in step S3003, the second image is resized to "1/a" times in the image resizing portion 1110 to be reduced in size, thereby matching the first image and the object in size. The reduction processing causes image deterioration, called "aliasing distortion", by the high frequency component. In order to prevent the aliasing distortion, the reduction processing is performed after the high frequency component is removed with a low-pass filter in the filter processing portion 1102 using the filter set in the filter setting portion 1101. While the second image is resized to "1/a" times in the above, it is possible to match the second image and the object in size by resizing the first image to "a" times. Alternatively, both images are resized so as to match each object in size In step S3004, the image resizing portion 1110 (image size changer) resizes the image focused on the backdrop (FIG. 7B) to a magnification set in step S3003. The result is illustrated in FIG. 9, and the image magnification of the main object in the resized image is equal to the image magnification of the main object in the image focused on the main object (FIG. 7A).

Figure 4:
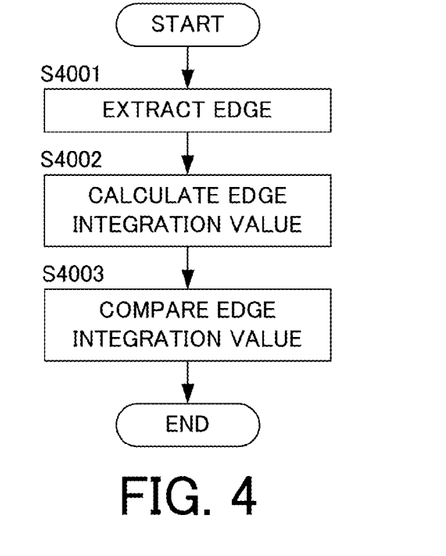
FIG. 4 is a flowchart that illustrates processings for determining an object area in first and second embodiments.

FIG. 4 is a flowchart that illustrates the procedure of the processing for determining the object area in step S3007. Hereinafter, the procedure of the processing for determining an object area at step S3007 will be described with reference to the flowchart in FIG. 4.

Figure 10A:
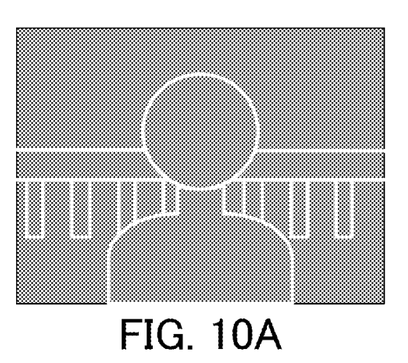
FIGS. 10A and 10B are edge images of the taken image in first embodiment.
Figure 10B:
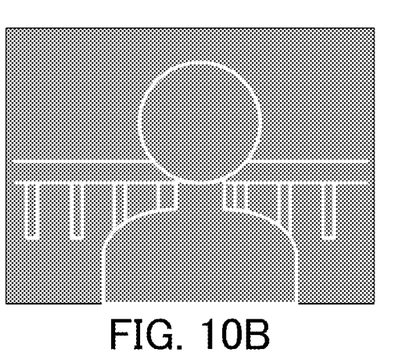

In step S4001, the edge extraction portion 1105 (edge extractor) extracts edges of two positioned images. The method for extracting the edges uses a high-pass filter that allows passage of a signal in only a high-frequency band. FIG. 10A illustrates a result of the edge extraction for the image of FIG. 7A, and FIG. 10B illustrates a result of the edge extraction for the image of FIG. 9. In order to match the size of the image in FIG. 10B to the size of the image in FIG. 10A, the edges are extracted after a peripheral part is added to the image of FIG. 9 so as to supplement shrunk parts. Moreover, the method for extracting the edges is not limited to the above, and other image signal may be used as long as the edges of the image is correctly extracted.

In step S4002, the edge integration value calculation portion 1106 calculates the edge integration value for each image (FIGS. 10A and 10B) where the edges have been extracted.

Figure 11:
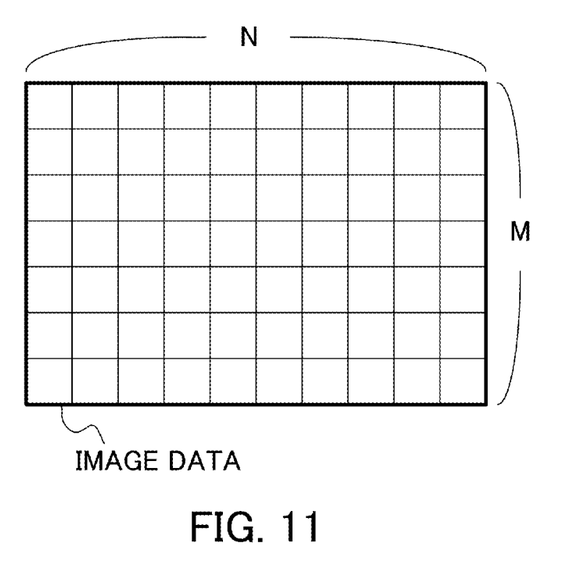
FIG. 11 is a pattern diagram for explaining that an image in first embodiment is divided into small areas.

The method for calculating the edge integration value, as illustrated in FIG. 11, divides the images of FIGS. 10A and 10B into a plurality of small areas by dividing the image into N parts in a horizontal direction and further dividing it into M parts in a vertical direction. The edge amount is integrated at each small area. In the following explanation for processing, each small area in FIG. 10A is called "blk_ref[0]~blk_ref[M*N−1]", and each small area in FIG. 10B is called "blk_comp[0]~blk_comp[M*N−1]".

In step S4003, the edge integration comparison value portion 1107 (object separator) compares the edge integration value at each small area that is calculated in step S4002.

In the method for the comparison, the edge integration value at each small area blk_ref[0]~blk_ref[M*N−1] in FIG.

10A is divided by the edge integration value at each small area blk_comp[0]~blk_comp[M*N−1] in FIG. 10B. Thereby, the ratio of the edge at each small area is calculated. The small area at which the ratio of the edge is near 1 is determined as an area of the main object. The ratio of the edge in a low-contrast area is also calculated as a value close to 1. A rough position on an image of the main object is determined by using a position on an image focused which an image is taken or by assuming that an object is located near the center of the screen. On that basis, when the distance from the determined position to a small area at which the ratio of the edge is near 1 is more than a constant amount, the position is determined as not the main object area but the low contrast area.

In the processing in step S4003, it is determined at each divided small area whether the small area is the main object area or not. If further divisions are performed in a small area at which the ratio of the edge is near 1 to repeat the processing, it can be determined at finer area whether the area is the main object area or not.

Hereinafter, the explanation returns to that in FIG. 3.

In step S3008, the blurring processing portion 1108 performs, as the blurring processing, a low-pass filter processing for an area excluding the main object that is determined in step S3007 in an image focused on the main object (FIG. 7A). As a result, a spatial frequency component that is below a cutoff frequency in the area excluding the main object image area is reduced, and the image of the object excluding the main object can be blurred more than the blur of an image taken by driving a real aperture stop or a lens.

Moreover, in this embodiment, the main object area is determined using the ratio of the edge integration value between two taken images, but the present invention is not limited to the method. For example, the object area may be determined by calculating a distance from the image pickup apparatus using a method commonly-known as DFF (Depth From Defocus) on the basis of the difference in the amount of blur between images taken at different focus positions and by separating into the object and the backdrop.

While the main object area is determined in image taking in this embodiment, the main object area may be determined in reproduction. In other words, the lens drive information or image magnification information is preliminarily recorded in a header file of two taken images, and the main object area may be determined by performing a processing in this embodiment when the image is reproduced on an image pickup apparatus or a personal computer having an image acquisition unit capable of acquiring the image.

The above mentioned configuration can separate the main object and the backdrop at high accuracy by equalizing the image magnification of the main object between images taken at different focus positions.

Second Embodiment

Figure 5:
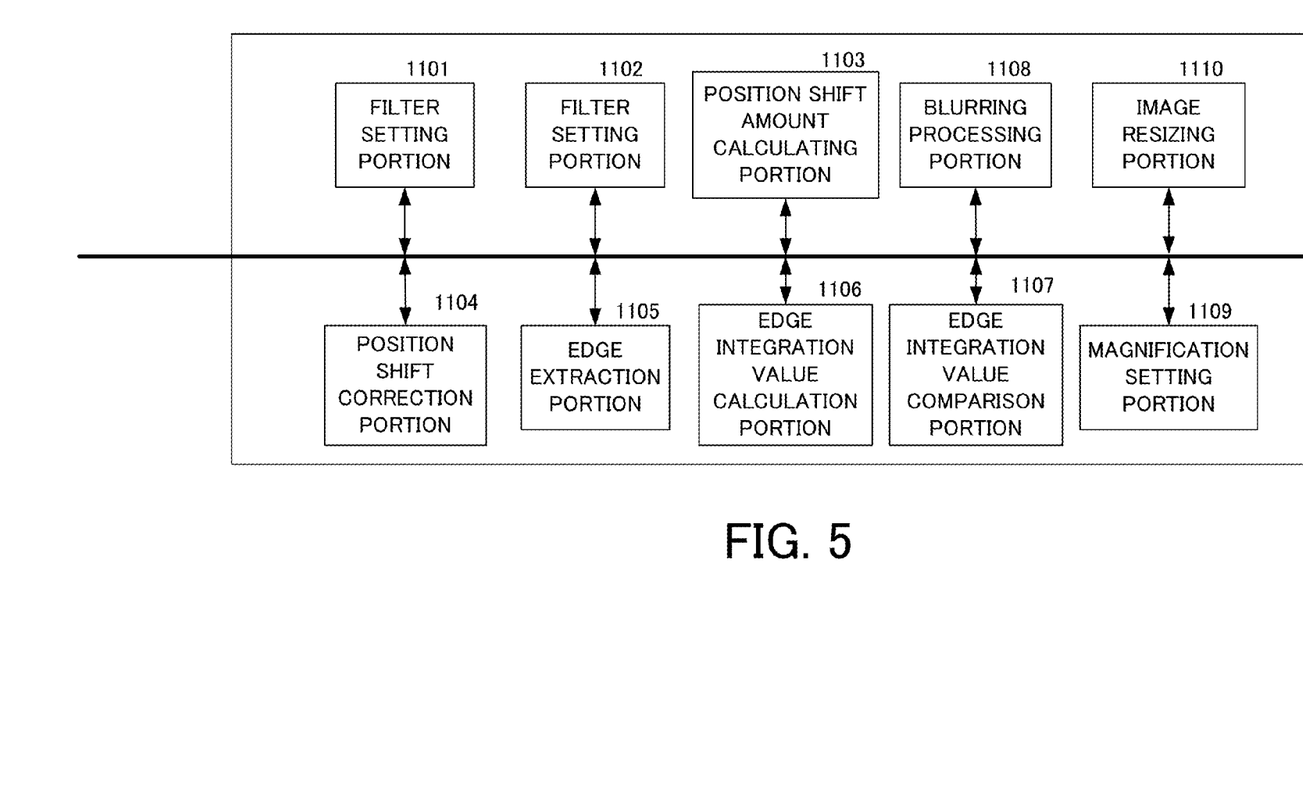
FIG. 5 is a block diagram of an image processing portion of the image processing apparatus in second embodiment.

Hereinafter, a method of separating into an object and a backdrop in second embodiment of the present invention will be described with reference to FIGS. 1 and 5.

The explanation for the configurations indicated by the same reference numerals as first embodiment will be omitted.

Figure 6:
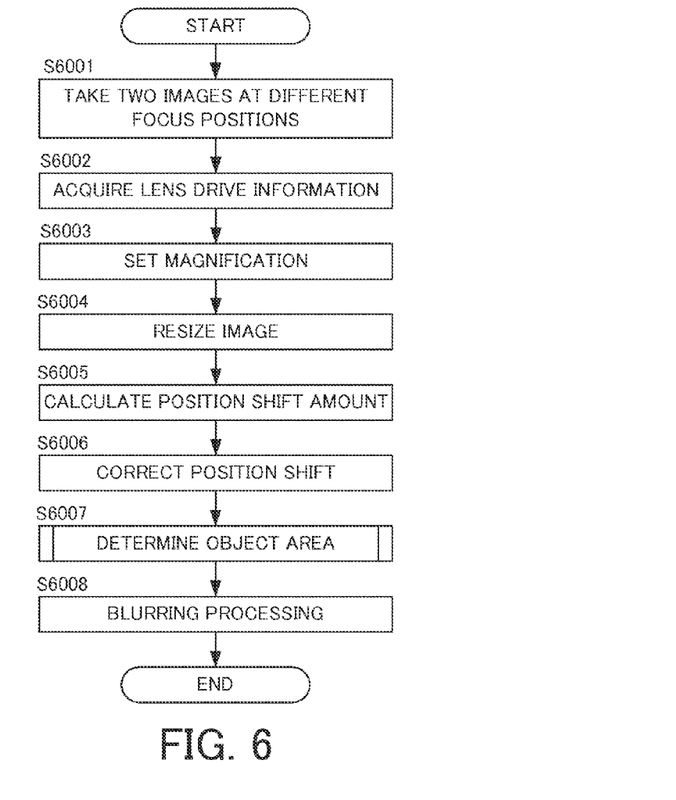
FIG. 6 is a flowchart in second embodiment.

FIG. 6 is a flowchart for explaining the method of separation into the main object and the backdrop in second embodiment of the present invention. Moreover, details will be omitted with regard to the same processing as first embodiment.

In second embodiment, a block matching is used as a method of calculating a position shift amount between aftermentioned images. Therefore, the lens drive amount Δx is not limited to a range capable of detecting, by the block matching, the amount of blur of when the focused position is changed.

Since steps S6001 to S6004 are the same processing as steps S3001 to S3004 in first embodiment, the explanation thereof will be omitted. However, in this embodiment, when the image is taken in S6001, it is assumed that a positional shift between two images is caused due to the camera shake or the like because an image is taken in a state of holding the image processing apparatus by hand. The two taken images are illustrated as FIGS. 12A and 12B.

In step S6005, a position shift amount calculating part 1103 (position shift amount calculator) calculates a position shift amount between two images that is necessary to match the position of the main object. Images for which the position shift amount is calculated are an image of FIG. 13 that is obtained in step S6004 and an image (FIG. 12A) focused on the main object. In the position shift amount calculation, an image of FIG. 12A denotes a reference image, and the position shift amount is calculated by defining the image of FIG. 13 as a comparison image.

For example, the following block matching is used as a method of calculating a position shift amount.

The reference image (FIG. 12A) and the comparison image for calculating the position shift amount from the reference image (FIG. 13), as illustrated in FIG. 11, are divided into a plurality of small areas by dividing the image into N parts in the horizontal direction and further dividing it into M parts in the vertical direction. A correlation value is calculated while a small area of the reference image is moved in a small area of the comparison image, and a motion vector to a position where the correlation value is smallest is defined as a position shift amount of the area. For example, a sum absolute difference (SAD) or the like is used as the correlation value. The method of calculating the position shift amount is not limited to the block matching, and other methods may be used.

Moreover, in this embodiment, the position shift amount is calculated with sub-pixel accuracy. A method of accumulation with the sub-pixel accuracy in the block matching uses a sub-pixel estimator capable of calculating a positional shift at each sub-pixel, such as an equiangular line fitting or a parabolic fitting that are described in Japanese patent Laid-Open 2009-301181.

Since the image magnification of the main object is equal, it is possible to obtain a calculation result of a position shift amount that has high accuracy in a small area where there is the main object.

Figure 12A:
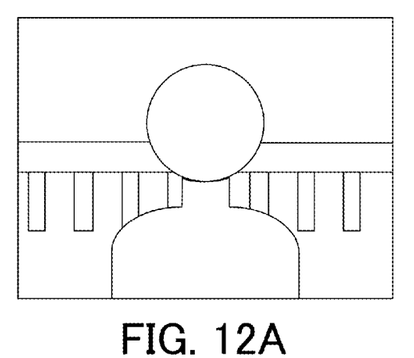
FIGS. 12A and 12B are taken images in second embodiment.
Figure 12B:
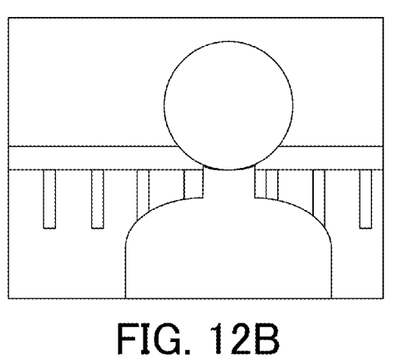
Figure 13:
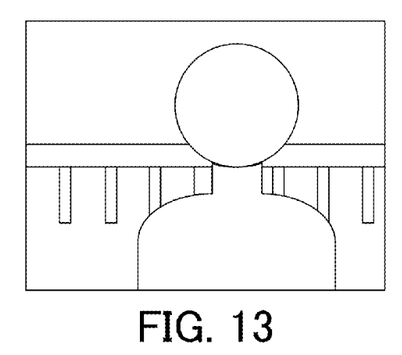
FIG. 13 is an image to which an image magnification of a second image in second embodiment is added.
Figure 14:
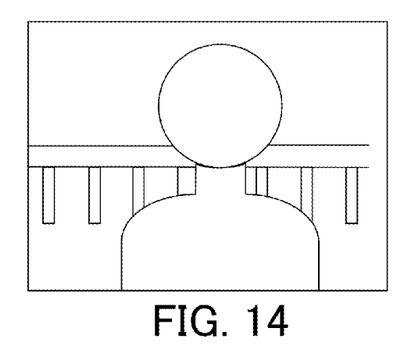
FIG. 14 is an image where the second image in second embodiment is positioned with a first image.

In step S6006, a positional shift correction part 1104, on the basis of the position shift amount in each small area calculated in step S6005, calculates a parameter of a projective transformation that indicates the deformation of the main object. Further, on the basis of the calculated projective transformation parameter, a projective transformation is performed for the comparison image (FIG. 13). An image obtained as the result is illustrated in FIG. 14, and is positioned so as to coincide with the main object in the reference image (FIG. 12A). On the other hand, the position of the backdrop that is a part other than the main object does not coincide. In addition, the method of correcting the positional shift is not limited to the projective transformation.

A processing of separating into the object and the backdrop is performed using an image (FIG. 14) that is positioned so as to coincide in the image magnification with the reference image (FIG. 12A). Since step S6007 that is a processing of separation into the object and the backdrop is the same processing as step S3007 in first embodiment, the explanation thereof is omitted. Since step S6008 that is blurring processing is also the same processing as S3008 in first embodiment, the explanation thereof is omitted.

The above-mentioned configuration can separate the main object and the backdrop with high accuracy by equalizing the image magnification of the main object even when the positional shift is caused between images taken at different focus positions.

In addition, the processing of the above-mentioned embodiment can be provided to a system, an apparatus, and a storage medium that store the program code of software realizing each function. The system or a computer (or CPU or MPU) of the apparatus reads out and executes the program code stored in the storage medium, thereby realizing the functions of the above embodiment. In this case, the program code itself that is read out from the storage medium executes the above-mentioned functions, and the present invention includes the storage medium that stores the program code. As a storage medium for providing such program code, for example, floppy (registered trademark) disk, hard disk, optical disk, magnetooptical disk, or the like can be used. Alternatively, CD-ROM, CD-R, magnet tape, nonvolatile memory card, ROM, or the like can be used.

Further, functions of each above-mentioned embodiment are not realized by only execution of the read out program in a computer. There is a case where OS (operating system) which is run on a computer or the like performs a part or the whole of the real processing on the basis of the instruction of the program code, and the function of each above-mentioned embodiment is realized by the processing.

Furthermore, the program code read out from the storage medium may be written in a memory mounted in a function enhancement board which is inserted into the computer or a function enhancement unit which is connected to the computer. There is also a case where, after that, a CPU or the like that is mounted on the function enhancement board or the function enhancement unit performs a part or the whole of the real processing on the basis of the instruction of the program code, and the functions of each above-mentioned embodiment are realized by the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-003736, filed on Jan. 12, 2012, which is hereby incorporated by reference herein in its entirety.

What is claimed is:

1. An image processing apparatus comprising:
a lens driver configured to drive a lens to change a focus position;
an image acquisition unit configured to acquire a first image and a second image taken at a different focus position from the first image;
an image size changer configured to change an image size of at least one of the first and second images, according to the difference between a position of the lens where the first image is taken and a position of the lens where the second image is taken;
a position shift amount calculator configured to calculate position shift amounts of the first and second images after the image size is changed by the image size changer;
a determination unit configured to determine a main object area and a backdrop area in the first image by using the first image and the second image that are positioned based on the position shift amounts; and
a blurring unit configured to perform a low-pass filter processing for an area determined as the backdrop area by the determination unit.

2. The image processing apparatus according to claim 1, wherein the position shift amount calculator calculates the position shift amount at each sub-pixel.

3. The image processing apparatus according to claim 1, wherein the processor includes an object separating unit that extracts edges of the first and second images and separates into the object and an area other than the object on the basis of extracted edge amounts of the first and second images.

4. The image processing apparatus according to claim 1, wherein the lens driver drives the lens within a detectable range by a sub-pixel estimator configured to calculate the position shift amount at each sub-pixel.

5. The image processing apparatus according to claim 1, wherein the determination unit is configured to determine the main object area and the backdrop area by comparing an edge integration value calculated for each area of the first image and an edge integration value calculated for each area of the second image.

6. An image processing method comprising the steps of:
(a) acquiring a first image;
(b) driving a lens to change a focus position;
(c) acquiring a second image taken at a different focus position from the first image;
(d) changing an image size of at least one of the first and second images, according to the difference between a position of the lens where the first image is taken and a position of the lens where the second image is taken;
(e) calculating position shift amounts of the first and second images after the image size is changed by a step (d);
(f) determining a main object area and a backdrop area in the first image by using the first image and the second image that are positioned based on the position shift amounts; and
(g) performing a low-pass filter processing for an area determined as the backdrop area by a step (f).

7. A non-transitory computer-readable storage medium storing a program causing a computer to execute an image processing method comprising the steps of:
(a) acquiring a first image;
(b) driving a lens to change a focus position;
(c) acquiring a second image taken at a different focus position from the first image;
(d) changing an image size of at least one of the first and second images, according to the difference between a position of the lens where the first image is taken and a position of the lens where the second image is taken;
(e) calculating position shift amounts of the first and second images after the image size is changed by a step (d);
(f) determining a main object area and a backdrop area in the first image by using the first image and the second image that are positioned based on the position shift amounts; and
(g) performing a low-pass filter processing for an area determined as the backdrop area by a step (f).

* * * * *